United States Patent
Sugimoto

(10) Patent No.: US 7,580,158 B2
(45) Date of Patent: Aug. 25, 2009

(54) IMAGE PROCESSING APPARATUS, METHOD AND PROGRAM

(75) Inventor: Yusuke Sugimoto, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 587 days.

(21) Appl. No.: 10/927,037

(22) Filed: Aug. 27, 2004

(65) Prior Publication Data

US 2005/0046902 A1    Mar. 3, 2005

(30) Foreign Application Priority Data

| Aug. 28, 2003 | (JP) | ............................. 2003-304383 |
| Aug. 28, 2003 | (JP) | ............................. 2003-304384 |
| Jul. 9, 2004 | (JP) | ............................. 2004-202615 |

(51) Int. Cl.
*G06T 5/00* (2006.01)
*G06K 9/44* (2006.01)

(52) U.S. Cl. .................... 358/3.27; 358/1.2; 358/1.9; 358/2.1; 358/3.01; 358/3.24; 358/3.26; 358/515; 358/518; 358/519; 358/520; 358/521; 358/522; 358/532; 382/165; 382/166; 382/167; 382/168; 382/170; 382/232; 382/233; 382/264; 382/266

(58) Field of Classification Search ................ 358/3.01, 358/3.27, 518–522; 382/166–172, 235, 243, 382/260, 264

See application file for complete search history.

(56) References Cited

U.S. PATENT DOCUMENTS

| 4,340,911 | A | * | 7/1982 | Kato et al. .................. 382/128 |
| 5,012,333 | A | * | 4/1991 | Lee et al. .................... 358/520 |
| 5,023,919 | A | * | 6/1991 | Wataya ....................... 382/263 |
| 5,150,432 | A | * | 9/1992 | Ueno et al. .................. 382/250 |
| 5,414,538 | A | * | 5/1995 | Eschbach ..................... 358/522 |
| 5,454,051 | A | * | 9/1995 | Smith ......................... 382/233 |
| 5,703,965 | A | * | 12/1997 | Fu et al. ..................... 382/232 |
| 5,805,727 | A | * | 9/1998 | Nakano ....................... 382/195 |
| 5,901,249 | A | * | 5/1999 | Ito ............................. 382/239 |
| 5,905,817 | A |   | 5/1999 | Matama |
| 5,959,722 | A | * | 9/1999 | Fussel et al. ................. 355/64 |
| 5,991,457 | A |   | 11/1999 | Ito et al. |
| 6,075,619 | A | * | 6/2000 | Iizuka ........................ 382/166 |
| 6,101,273 | A | * | 8/2000 | Matama ....................... 382/169 |
| 6,665,446 | B1 | * | 12/2003 | Kato .......................... 382/251 |
| 6,668,068 | B2 | * | 12/2003 | Hashimoto ................... 382/100 |
| 6,738,527 | B2 | * | 5/2004 | Kuwata et al. ............... 382/266 |
| 6,868,184 | B2 | * | 3/2005 | Yamaguchi et al. ......... 382/233 |
| 7,356,190 | B2 | * | 4/2008 | Mizoguchi et al. .......... 382/233 |
| 7,466,866 | B2 | * | 12/2008 | Steinberg .................... 382/243 |

* cited by examiner

*Primary Examiner*—King Y Poon
*Assistant Examiner*—Richard Z Zhu
(74) *Attorney, Agent, or Firm*—Sughrue Mion, PLLC

(57) ABSTRACT

An image analysis unit analyzes an image on which AE processing has been performed and obtains a coefficient for obtaining a gradient of a compression table for compressing a dynamic range of the image. A compression table creation unit creates a compression table. A correction amount calculation unit judges whether the gradient of the compression table is larger than a predetermined threshold value. If the judgment is YES, loss of fine texture in the image by dynamic range compression is significant. Therefore, the correction amount calculation unit calculates a correction amount by using an unsharp image of the image. If the judgment is NO, loss of fine texture in the image is insignificant, the correction amount calculation unit calculates the correction amount by using the image. A compression processing unit compresses the dynamic range of the image by the correction amount and obtains a processed image data set.

12 Claims, 11 Drawing Sheets

IMAGE PROCESSING APPARATUS, METHOD AND PROGRAM

BACKGROUND OF THE INVENTION

1. Field of the Invention

The present invention relates to an image processing apparatus and an image processing method for compressing dynamic ranges of images into a dynamic range of an output device such as a printer, for outputting the images. The present invention also relates to a program for causing a computer to execute the image processing method.

2. Description of the Related Art

Conventionally, images obtained by taking photographs of subjects with photography devices such as digital cameras and images obtained by photo-electrically reading images recorded on films such as negative films and reversible films, prints or the like are reproduced at reproduction devices such as printers. When the images are reproduced at the reproduction devices, dynamic ranges of the images are compressed into dynamic ranges of the reproduction devices to prevent loss of gradation in highlights and/or shadows of the images.

As an example of the dynamic range compression method, a method is proposed, wherein filtering processing is performed on an image by using a low-pass filter, an unsharp image only showing low spatial frequency structures included in the image is produced, and the dynamic range of the image is compressed by using the unsharp image. Accordingly, loss of gradation in both highlights and shadows of the image is prevented while contrast in fine texture in the highlights and the shadows of the images is preserved (Refer to U.S. Pat. No. 6,101,273).

A method is also proposed, wherein when a dynamic range is compressed by using an unsharp image, an IIR (Infinite Impulse Response) filter is used to save a line memory of a filter (Refer to U.S Pat. No. 5,905,817). Further, a method is also proposed, wherein a plurality of unsharp images in various frequency bands is produced and a dynamic range is compressed by using a cumulative signal of the plurality of unsharp images produced to prevent generation of artifacts at edges in a processed image (Refer to U.S. Pat. No. 5,991,457).

In the methods disclosed in U.S. Pat. Nos. 5,905,817 and 5,991,457, the line memory of the filter may be saved and the image quality of the processed image may be improved. However, an amount of operations for compressing the dynamic range is large and a long time is required for processing.

Further, in the aforementioned method of compressing the dynamic range by using the unsharp image, when the unsharp image is produced in the vicinity of edges where the density of the image sharply changes, the edges are included in an area to which a mask for producing the unsharp image is applied. Therefore, especially if a degree of dynamic range compression is high, that is, a correction amount of the dynamic range is large, the unsharp image in the vicinity of the edges is influenced by the density of the edges. Therefore, overshoot, undershoot or an artifact such as a false contour are generated in the image obtained by compressing the dynamic range by using the unsharp image, and the image quality of the processed image drops.

In the method disclosed in U.S. Pat. No. 5,905,817, generation of artifacts may be prevented and the image quality of the processed image may be improved. However, since the plurality of unsharp images in various frequency bands is produced, the amount of operations for compressing the dynamic range is large and a long time is required for processing.

SUMMARY OF THE INVENTION

In view of the foregoing circumstances, it is the first object of the present invention to reduce processing time for compressing a dynamic range of an image.

Further, it is the second object of the present invention to obtain a high quality processed image by performing processing with a small amount of operations when the dynamic range of the image is compressed.

A first image processing apparatus according to the present invention is an image processing apparatus comprising:
   a correction amount calculation means for calculating a correction amount to compress a dynamic range of an image based on an image data set representing the image;
   a processing means for obtaining a processed image of which the dynamic range has been compressed by performing image processing on the image, which includes processing for compressing the dynamic range of the image, by correcting the image data set by the correction amount; and
   a judgment means for judging whether a change amount of the image by the image processing is larger than a predetermined threshold value, wherein if the judgment is YES, the correction amount calculation means produces an unsharp image of the image and calculates the correction amount by using the unsharp image, or if the judgment is NO, the correction amount calculation means calculates the correction amount by using the image.

In the first image processing apparatus according to the present invention, the judgment means may make the judgment by using at least one of a value of a compression rate for compressing the dynamic range, a value of a gradient of a compression table used for calculating the correction amount, and if the image processing includes AE (Automatic Exposure) processing, a value of a correction amount of density, as the change amount of the image.

A first image processing method according to the present invention is an image processing method comprising the steps of:
   calculating a correction amount for compressing a dynamic range of an image based on an image data set representing the image;
   obtaining a processed image of which the dynamic range has been compressed by performing image processing on the image, which includes processing for compressing the dynamic range of the image, by correcting the image data set by the correction amount;
   judging whether a change amount of the image by the image processing is larger than a predetermined threshold value; and
   if the judgment is YES, producing an unsharp image of the image and calculating the correction amount by using the unsharp image, or if the judgment is NO, calculating the correction amount by using the image.

A program for causing a computer to execute the first image processing method according to the present invention maybe provided.

In the first image processing method and apparatus according to the present invention, judgment is made as to whether a change amount of an image by image processing including dynamic range compression is larger than a predetermined threshold vale. If the judgment is YES, loss of fine texture in the image by the dynamic range compression is significant. Therefore, an unsharp image of the image is produced and a correction amount of the dynamic range is calculated by using the unsharp image as disclosed in U.S. Pat. No. 6,101, 273. If the judgment is NO, the change amount of the image by image processing is small and loss of the fine texture in the image is insignificant. Therefore, the correction amount of the dynamic range is calculated by using the image instead of the unsharp image. Hence, if the change amount of the image by image processing is small, an amount of operations may be reduced when compared with a case of calculating the correction amount by using the unsharp image. Accordingly, processing time for performing the image processing on the image, which includes the dynamic range compression, may be reduced.

Further, at least one of a value of a compression rate for compressing the dynamic range of the image, a value of a gradient of a compression table used for calculating the correction amount to compress the dynamic range, and if the image processing includes AE processing, a value of a correction amount of brightness may be used as the change amount of the image. Accordingly, the judgment may be easily made as to whether the change amount of the image is larger than the predetermined threshold value.

A second image processing apparatus according to the present invention is an image processing apparatus for obtaining a processed image of which the dynamic range has been compressed by compressing the dynamic range of an image, the apparatus comprising:

a compression table creation means for creating a first compression table to compress the dynamic range of the image and a second compression table to further compress the dynamic range of the image of which the dynamic range has been compressed by using the first compression table;

a first dynamic range compression processing means for obtaining an intermediate processed image by producing an unsharp image of the image, calculating a first correction amount to compress the dynamic range of the image by using the unsharp image and the first compression table and performing first dynamic range compression processing to compress the dynamic range of the image by the first correction amount; and a second dynamic range compression processing means for obtaining the processed image by calculating a second correction amount to further compress the dynamic range of the image by using the intermediate processed image and the second compression table and performing second dynamic range compression processing for compressing the dynamic range of the image by the second correction amount.

Here, a processed image of which the dynamic range has been compressed in a desired manner may also be obtained by using a combined compression table of the first compression table and the second compression table, producing an unsharp image of the image and calculating a correction amount of the dynamic range. However, if the correction amount is large, artifacts might be generated in the vicinity of the edges of the image. In the second image processing apparatus according to the present invention, the first compression table and the second compression table have the following relationship. When only the first compression table is used to calculate the correction amount, the dynamic range compression rate is at a level where artifacts are not generated. When the correction amount is further calculated by using the second compression table and dynamic range compression processing is performed, a processed image of which the dynamic range has been compressed in a desired manner may be obtained.

In some cases, after the processed image has been obtained by compressing the dynamic range at the image processing apparatus according to the present invention, the dynamic range of the processed image is further compressed by a fixed correction amount. For example, the dynamic range of the processed image is further compressed by using a fixed compression table for compressing the highlight side and preserving the gradation in a medium density area at the same time. In these cases, it is preferable to create a second compression table including a maximum correction amount by which the correction amount in the highlight side corrected by using the fixed compression table can be cancelled.

In the second image processing apparatus according to the present invention, the compression table creation means may judge whether the second compression table should be created, and only if the judgment is YES, the compression table creation means may create the second compression table. If the second compression table is not created, the first dynamic range compression processing means may output an intermediate processed image obtained by the first dynamic range compression processing means as the processed image.

A second image processing method according to the present invention is an image processing method for obtaining a processed image of which the dynamic range has been compressed by compressing the dynamic range of an image, the method comprising the steps of:

creating a first compression table to compress the dynamic range of the image and a second compression table to further compress the dynamic range of the image of which the dynamic range has been compressed by using the first compression table;

obtaining an intermediate processed image by producing an unsharp image of the image, calculating a first correction amount to compress the dynamic range of the image by using the unsharp image and the first compression table and performing first dynamic range compression processing to compress the dynamic range of the image by the first correction amount; and obtaining the processed image by calculating a second correction amount to further compress the dynamic range of the image by using the intermediate processed image and the second compression table and performing second dynamic range compression processing to compress the dynamic range of the image by the second correction amount.

A program for causing a computer to execute the second image processing method according the present invention may be provided.

When the dynamic range compression rate is large, if the dynamic range is compressed by producing an unsharp image, loss of fine texture in the image may be prevented. However, artifacts are generated in the vicinity of the edges of the processed image. Therefore, in the second image processing method and apparatus according to the present invention, the first compression table and the second compression table, for supplementing the insufficient compression rate during dynamic range compression by using the first compression table, are created. First, an unsharp image of the image is produced and a first correction amount for compressing the dynamic range of the image is calculated by using the unsharp image and the first compression table. Then, the first dynamic range compression processing is performed by the first correction amount and an intermediate processed image is obtained. Here, in the first dynamic range compression processing, the correction amount of the dynamic range is calculated by using the unsharp image. However, the correction amount of the dynamic range is smaller than the correction amount during dynamic range compression by using a combined compression table of the first compression table and the second compression table. Therefore, loss of fine texture in the image may be prevented and generation of artifacts in the vicinity of the edges in the image may be prevented. However, since the correction amount of the dynamic range is small, an image, of which the dynamic range has been compressed in a desired manner, may not be obtained.

In the second image processing method and apparatus according to the present invention, the second correction amount for compressing the dynamic range of the image is calculated by using the intermediate processed image and the second compression table. Then, second dynamic range compression processing by the second correction amount is further performed on the intermediate processed image and a processed image is obtained. Accordingly, loss of fine texture in the image may be prevented and generation of artifacts in the vicinity of the edges may be prevented by performing processing in a relatively small amount of operations. Further, a high quality processed image of which the dynamic range has been compressed in a desired manner may be obtained.

In some cases, an image of which the dynamic range has been compressed in a desired manner may be obtained without performing the second dynamic range compression processing. Therefore, judgment is made as to whether the second compression table should be created. Only if the judgment is YES, the second compression table is created. If the second compression table is not created, the intermediate processed image obtained in the first dynamic range compression processing is output as the processed image. Accordingly, the amount of operations can be further reduced.

Note that the program of the present invention may be provided being recorded on a computer readable medium. Those who are skilled in the art would know that computer readable media are not limited to any specific type of device, and include, but are not limited to: floppy disks, CD's RAM'S, ROM's, hard disks, and magnetic tapes, in which computer instructions can be stored and/or transmitted. Additionally, computer instructions include, but are not limited to: source, object and executable code, and can be in any language including higher level languages, assembly language, and machine language.

DESCRIPTION OF THE PREFERRED EMBODIMENTS

Figure 1:
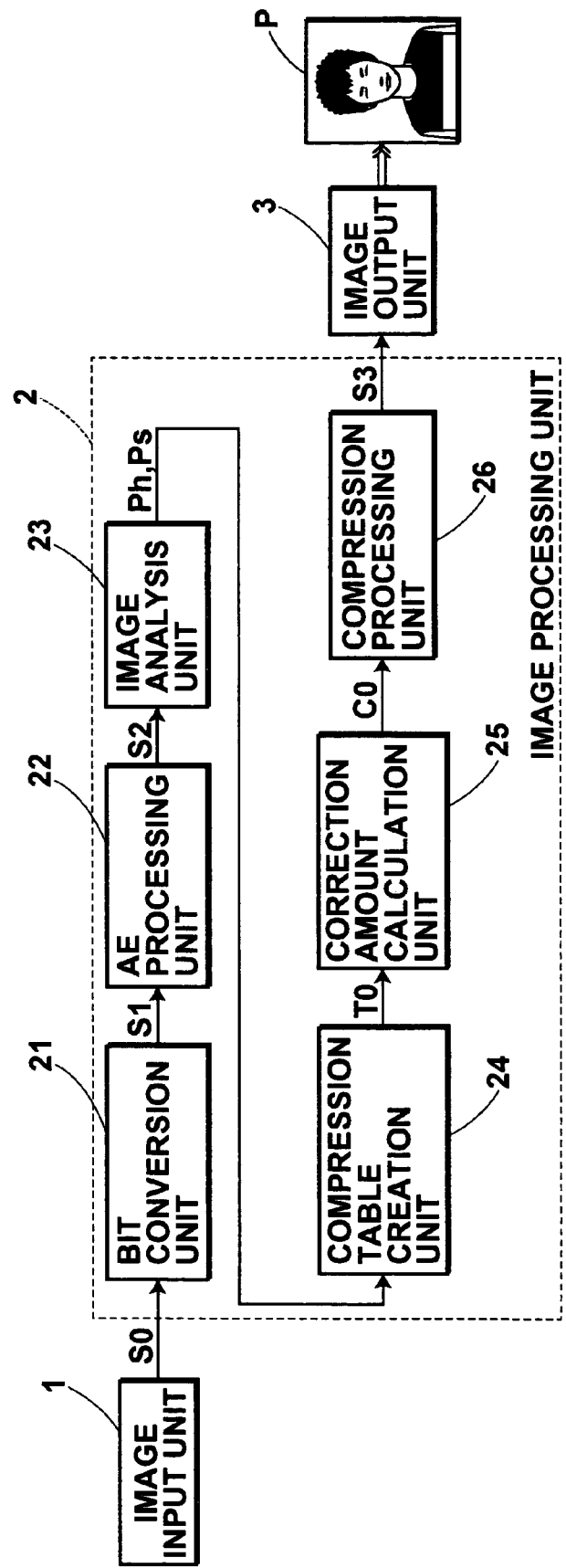
FIG. 1 shows a schematic block diagram illustrating the configuration of an image processing apparatus according to the first embodiment of the present invention.

Hereinafter, embodiments of the present invention will be described with reference to drawings. FIG. 1 shows a schematic block diagram illustrating the configuration of an image processing apparatus according to the first embodiment of the present invention. As illustrated in FIG. 1, the image processing apparatus according to the first embodiment includes an image input unit 1 for receiving an input of an image data set S0 including each of the color components of RGB data, which represents a color image, an image processing unit 2 for obtaining a processed image data set S3 by performing image processing on the image data set S0, which includes dynamic range compression processing, and an image output unit 3 such as a printer and a monitor, for reproducing the processed image data set S3. In the first embodiment, the image output unit 3 is a printer for obtaining a print P of the processed image data set S3.

The image input unit 1 includes a media drive for reading the image data set S0, which is recorded on a medium, from the medium and various kinds of interfaces for receiving an input of the image data set S0 sent via a network. The image data set S0 may be obtained with a photography device such as a digital camera. The image data set S0 may also be obtained by photo-electrically reading an image recorded on a film or an original document. In the first embodiment, it is assumed that the image data set S0 of 8 bits is input.

The image processing unit 2 includes a bit conversion unit 21 for converting an image data set S0 of 8 bits to an image data set of 10 or 12 bits to obtain an image data set S1, an AE processing unit 22 for performing AE processing on the image data set S1 to obtain an image data set S2, on which AE processing has been performed, and an image analysis unit 23 for analyzing an image, (hereinafter, reference sign S2 is also used to indicate the image), which is represented by the image data set S2 and calculating a coefficient for obtaining a gradient of a compression table T0 to compress the dynamic range. The image processing unit 2 also includes a compression table creation unit 24 for creating the compression table T0 to compress the dynamic range of the image S0 based on the coefficient calculated by the image analysis unit 23, a correction amount calculation unit 25 for calculating a correction amount C0 of the dynamic range by using the compression table T0 created by the compression table creation unit 24 and a compression processing unit 26 for obtaining a processed image data set S3 by compressing the dynamic range of the image S2 by the correction amount C0.

The bit conversion unit 21 converts the image data set S0 of 8 bits to an image data set of 10 or 12 bits, which are larger than 8 bits, and obtains the image data set S1 on which bit conversion has been performed.

Figure 2:
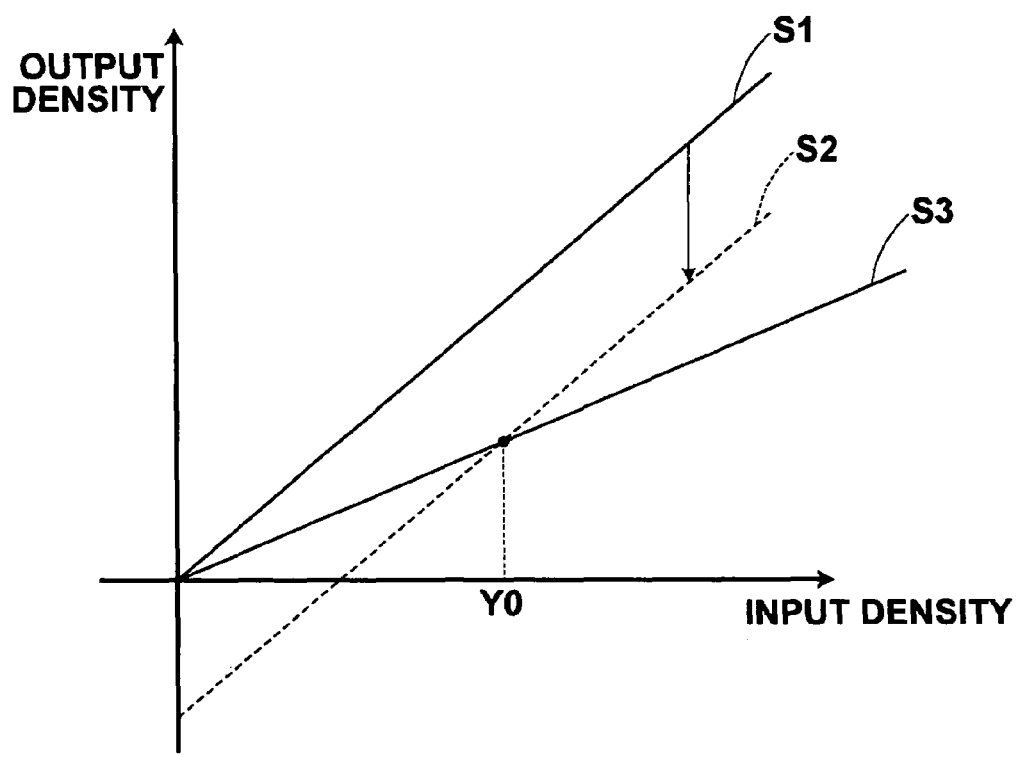
FIG. 2 shows a chart for explaining AE processing and dynamic range compression processing in the first embodiment.

The AE processing unit 22 detects a flesh color region in an image, (hereinafter, reference sign S1 is also used to indicate the image), which is represented by the image data set S1, as a facial region, adds or subtracts a predetermined value for all of the pixels of the image S1 so that the brightness of the facial region becomes a predetermined appropriate level, and obtains the image data set S2 on which AE processing has been performed. Accordingly, for example, if the predetermined value is subtracted for each pixel of the image S1, the density in the entire area of the image S1 is reduced as illustrated in FIG. 2. The AE processing method is not limited to this method, and various known methods may be applied.

The image analysis unit 23 sets a compression rate of the image S2 in the following manner. First, the image analysis unit 23 calculates a density Y of each pixel of the image S2 by the following expression (1). Note that R0, G0 and B0 are RGB data of each pixel of the image S2.

$$Y = 0.3125 R_0 + 0.3750 G_0 + 0.3125 B_0 \quad (1)$$

Figure 3:
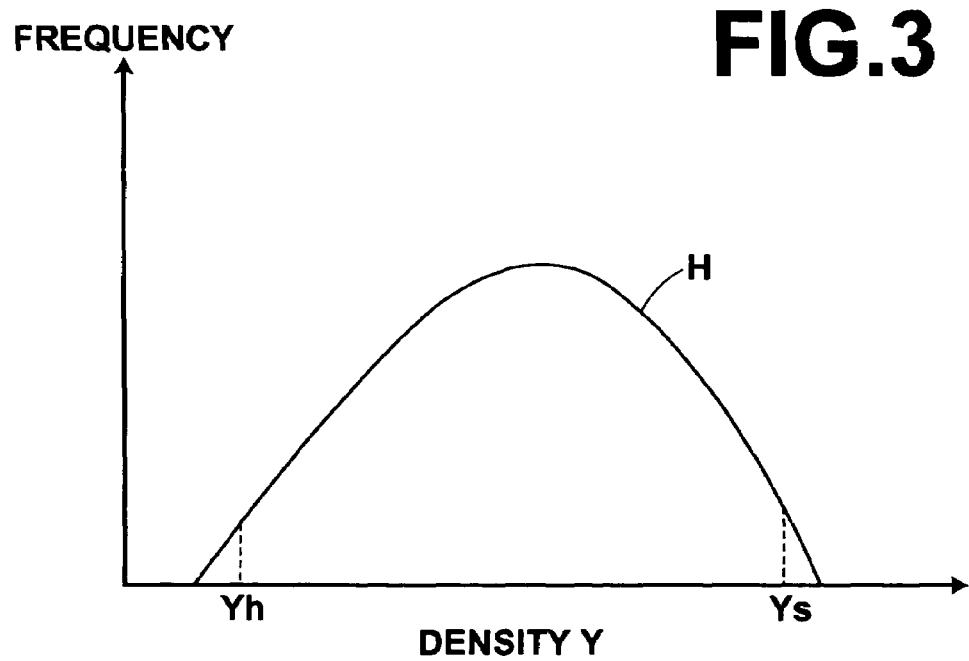
FIG. 3 shows a histogram of density values.

Next, the image analysis unit 23 obtains a histogram of the density Y. FIG. 3 shows a histogram H of the density Y. The image analysis unit 23 obtains a density where a cumulative relative frequency from the highlight side indicates 3% as a highlight density Yh of the image data set S2, and a density where a cumulative relative frequency from the shadow side indicates 3% as a shadow density Ys of the image data set S2, respectively.

Meanwhile, information on a minimum density Dmin and a maximum density Dmax which can be reproduced by the image output unit 3 has been input to the image analysis unit 23. The image analysis unit 23 compares the highlight density Yh and the minimum density Dmin. If the highlight density Yh is lower than the minimum density Dmin, a coefficient Ph for obtaining a gradient of the compression table T0 is calculated so that the highlight density Yh with respect to a predetermined standard density Y0 does not exceed the minimum density Dmin. Meanwhile, the image analysis unit 23 compares the shadow density Ys and the maximum density Dmax. If the shadow density Ys is higher than the maximum density Dmax, a coefficient Ps for obtaining a gradient of the compression table T0 is calculated so that the shadow density Ys with respect to the predetermined standard density Y0 does not exceed the maximum density Dmax. Specifically, the coefficients Ph and Ps are calculated by the following expressions (2) and (3):

$$Ph = (D\min - Y_0)/(Yh - Y_0) \quad (2)$$

$$Ps = (D\max - Y_0)/(Ys - Y_0) \quad (3).$$

Here, for example, if a subject included in the image S0 is a person, a value of the standard density Y0 is set to a value between 0.50 and 0.70 (as a ratio to a range corresponding to a bit number), which is substantially the same as a density of the flesh color. Preferably, the value should be set to 0.6.

If the highlight density Yh does not exceed the minimum density Dmin, the coefficient Ph is not calculated. If the shadow density Ys does not exceed the maximum density Dmax, the coefficient Ps is not calculated.

Figure 4:
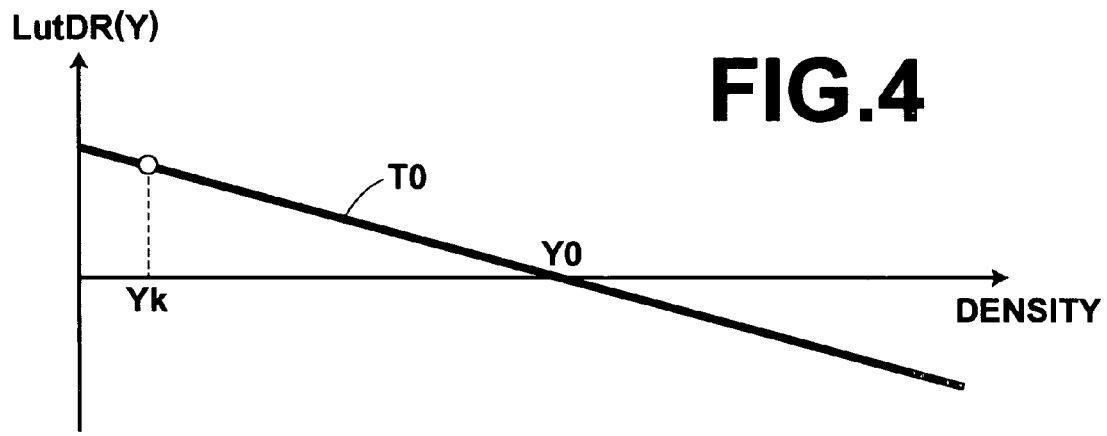
FIG. 4 shows an example of a compression table for compressing a dynamic range in a shadow side and a highlight side.

The compression table creation unit 24 creates the compression table based on the coefficients Ph and Ps set by the image analysis unit 23. FIG. 4 shows an example of the compression table. As illustrated in FIG. 4, the aforementioned standard density Y0 is indicated in the compression table T0. A gradient of the straight line is Ph−1 in the highlight side (i.e., left side of the standard density Y0). A gradient of the straight line is Ps−1 in the shadow side (i.e., right side of the standard density Y0).

Figure 5:
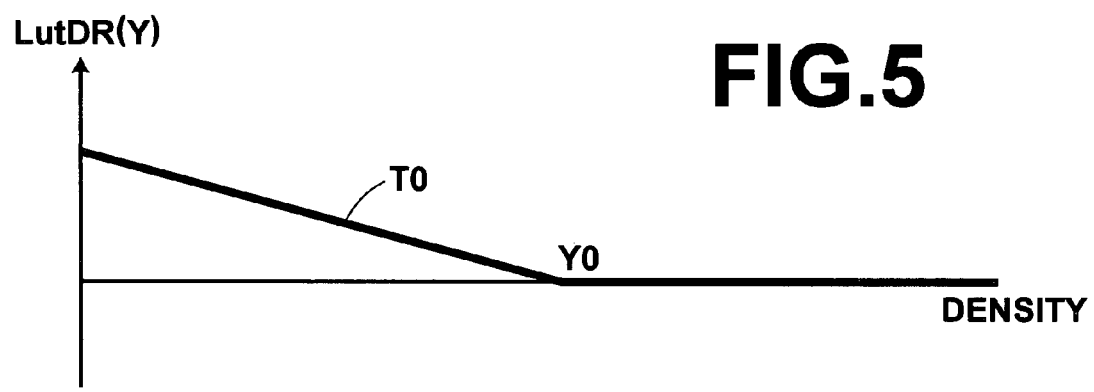
FIG. 5 shows an example of a compression table for compressing a dynamic range in the highlight side.
Figure 6:
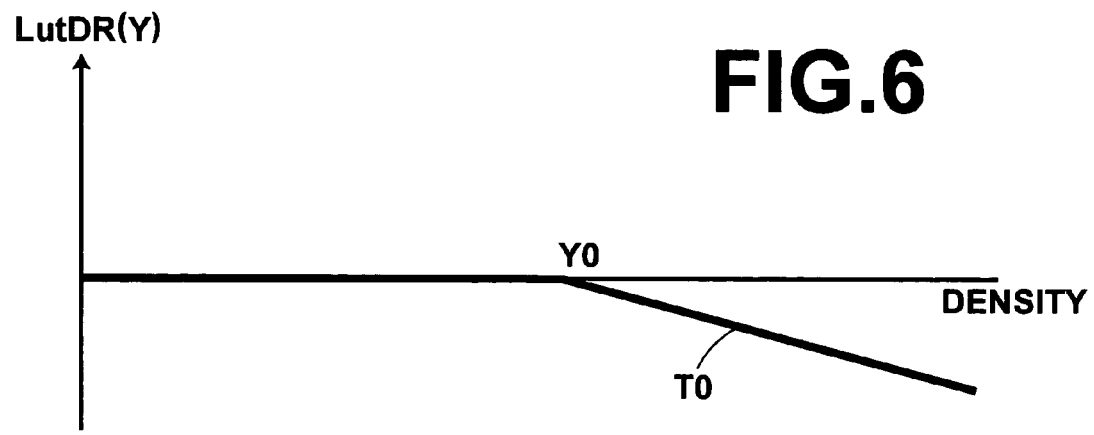
FIG. 6 shows an example of a compression table for compressing a dynamic range in the shadow side.

If the image analysis unit 23 has not calculated the coefficient Ps, a compression table T0 for compressing only the highlights, as illustrated in FIG. 5, is created. Further, if the image analysis unit 23 has not calculated the coefficient Ph, a compression table T0 for compressing only the shadows, as illustrated in FIG. 6, is created. In the first embodiment, it is assumed that the compression table T0 for compressing both the shadows and the highlights, as illustrated in FIG. 4, has been created.

If a point where the gradient changes (i.e., a point of the standard density Y0) is discontinuous in the compression table T0, artifacts might be generated in a processed image. Therefore, generation of the artifacts may be prevented by setting a function so that the gradient becomes continuous.

The correction amount calculation unit 25 calculates the density Y of each pixel of the image S2 by the aforementioned expression (1). Then, the correction amount calculation unit 25 judges whether a value |Ph−1| of the gradient in the highlight side of the created compression table T0 is larger than a threshold value Th1 and a value |Ps−1| of the gradient in the shadow side of the created compression table T0 is larger than a threshold value Th2. If the judgment is YES, loss of fine texture in the image S2, caused by dynamic range compression, becomes significant. Therefore, filtering processing is performed on the image S2 by using a low-pass filter in a predetermined size and an unsharp image S2' having an unsharp density Y' is obtained. Here, if the size of the low-pass filter is too small, the sharpness is unnaturally emphasized and overshoot at edges becomes significant. In contrast, if a size of a major subject such as a face is small, the effect of an unsharp mask is not sufficiently realized and a size of the apparatus becomes large because an amount of operations increases. Therefore, in the first embodiment, the size of the low-pass filter is set to prevent these problems.

Then, a value LutDR(Y') is calculated as the correction amount C0 of the dynamic range. The value LutDR(Y') may be obtained with reference to the compression table T0 by using the unsharp density Y'.

Meanwhile, if the judgment is NO, the change amount of the image S2 by the dynamic range compression processing is small and loss of the fine texture in the image S2 is insignificant. Therefore, a value LutDR(Y), as the correction amount C0 of the dynamic range, is calculated with reference to the compression table T0 by using the density Y instead of the unsharp density Y'.

The compression processing unit 26 performs dynamic range compression processing on the image data set S2 based on the correction amount C0 calculated by the correction amount calculation unit 25. Specifically, each of the processed color components R1, G1 and B1 of RGB data is obtained by adding the correction amount C0 to each of the color components R0, G0 and B0 of RGB data of each pixel of the image S2 as shown in the following expressions (4)-(6):

$$R1 = R0 + C0 \quad (4)$$

$$G1 = G0 + C0 \quad (5)$$

$$B1 = B0 + C0 \quad (6).$$

Then, the compression processing unit 26 outputs a processed image data set S3 including the processed color components R1, G1 and B1 of RGB data to the image output unit 3.

Accordingly, the density in the highlight side of the image S2 with respect to the standard density Y0 is increased and the density in the shadow side of the image S2 with respect to the standard density Y0 is reduced, as illustrated in FIG. 2. In this way, the dynamic range of the image S2 is compressed.

The image output unit 3 converts the processed image data set S3 into an 8-bit data set and obtains a print P of the processed image by printing out.

Figure 7:
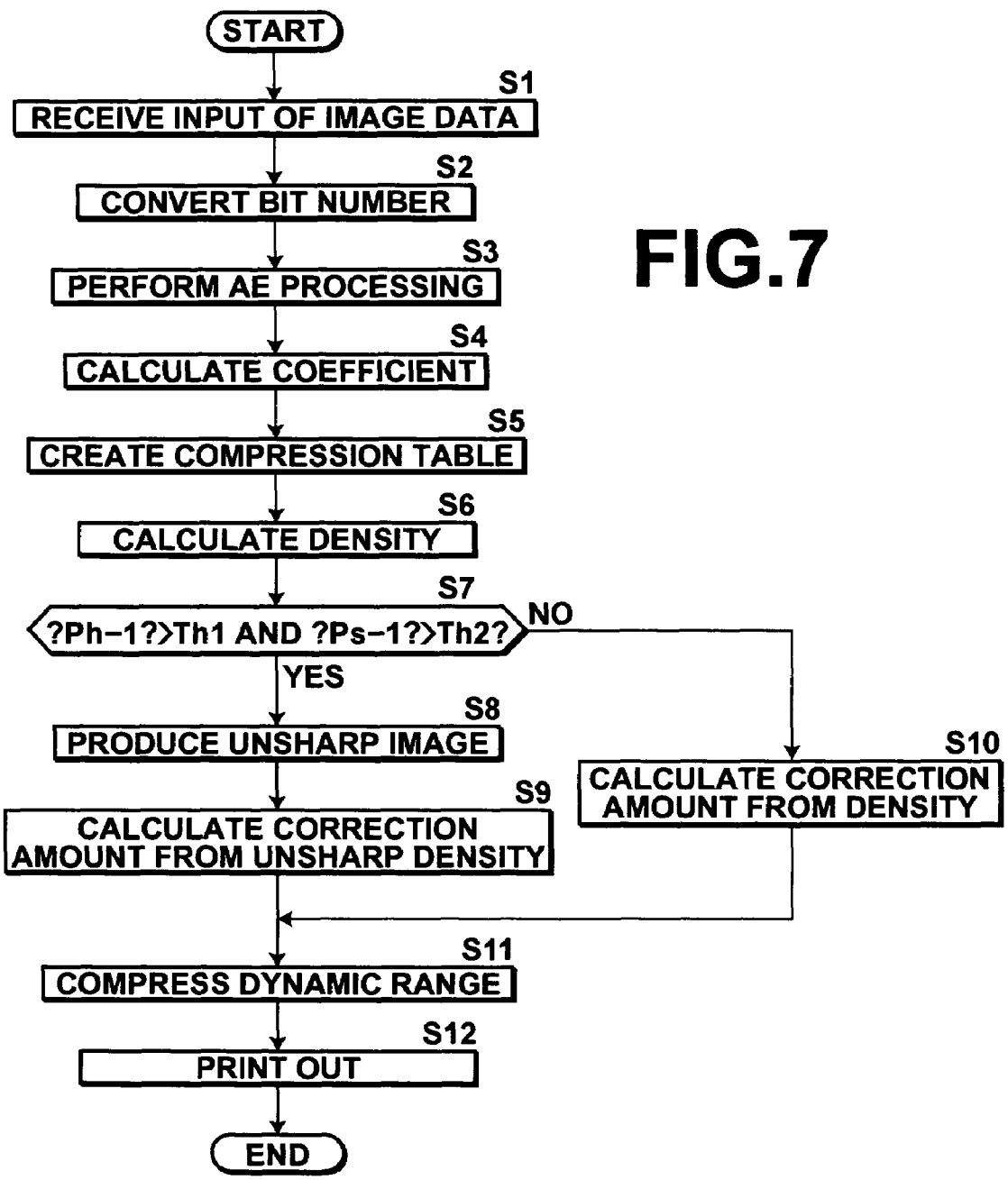
FIG. 7 shows a flow chart of processing performed in the first embodiment.

Next, an operation in the first embodiment will be described. FIG. 7 shows a flow chart of processing performed in the first embodiment. First, the image input unit 1 receives an input of the image data set S0 (step S1). Then, the bit conversion unit 21 performs bit conversion on the image data set S0 and obtains the image data set S1 (step S2). The AE processing unit 22 performs AE processing on the image data set S1 and obtains the image data set S2 (step S3). Then, the image analysis unit 23 calculates the coefficients Ph and Ps (step S4) and the compression table creation unit 24 creates the compression table T0 based on the coefficients Ph and Ps (step S5).

Next, the correction amount calculation unit 25 calculates the density Y of each pixel of the image S2 (step S6) and judges whether the value |Ph−1| of the gradient in the highlight side of the compression table T0 is larger than the threshold value Th1 and the value |Ps−1| of the gradient in the shadow side is larger than the threshold value Th2 (step S7). If step S7 is YES, the correction amount calculation unit 25 produces the unsharp image S2' having the unsharp density Y' obtained from the density Y (step S8) and calculates the correction amount C0 of the dynamic range from the unsharp density Y' with reference to the compression table T0 (step S9). Meanwhile, if step S7 is NO, the correction amount calculation unit 25 calculates the correction amount C0 of the dynamic range from the density Y (step S10).

Then, the compression processing unit 26 compresses the dynamic range of the image S2 by the correction amount C0 and obtains the processed image data set S3 (step S11). The image output unit 3 prints out the processed image data set S3 (step S12) and processing ends.

As described above, in the first embodiment, the judgment is made as to whether the value |Ph−1| of the gradient in the highlight side of the compression table T0 is larger than the threshold value Th1 and the value |Ps−1| of the gradient in the shadow side is larger than the threshold value Th2. If the judgment is YES, the unsharp image S2' of the image S2 is produced and the correction amount C0 of the dynamic range is calculated from the unsharp density Y'. If the judgment is NO, the correction amount C0 of the dynamic range is calculated without producing the unsharp image S2' of the image S2. Therefore, when the gradient of the compression table T0 is small and the change amount of the image by dynamic range compression processing is small, the amount of operations may be reduced when compared with the case of calculating the correction amount C0 from the unsharp density Y'.

Accordingly, processing time for performing the dynamic range compressing processing may be reduced.

In the first embodiment as described above, if the value |Ph−1| of the gradient in the highlight side of the compression table T0 is larger than the threshold value Th1 and the value |Ph−1| of the gradient in the shadow side is larger than the threshold value Th2, the correction amount C0 of the dynamic range is calculated from the unsharp density Y'. Alternatively, if the value |Ph−1| of the gradient in the highlight side of the compression table T0 is larger than the threshold value Th1 or the value |Ps−1| of the gradient in the shadow side is larger than the threshold value Th2, the correction amount C0 of the dynamic range may be calculated from the unsharp density Y'. Meanwhile, if the compression table T0 for compressing the dynamic range in the highlight side is obtained as illustrated in FIG. 5, the judgment should be made as to whether the value |Ph−1| of the gradient in the highlight side is larger than the threshold value Th1. If the compression table T0 for compressing the dynamic range in the shadow side is obtained, as illustrated in FIG. 6, the judgment should be made as to whether the value |Ph−1| of the gradient in the shadow side is larger than the threshold value Th2.

Figure 8:
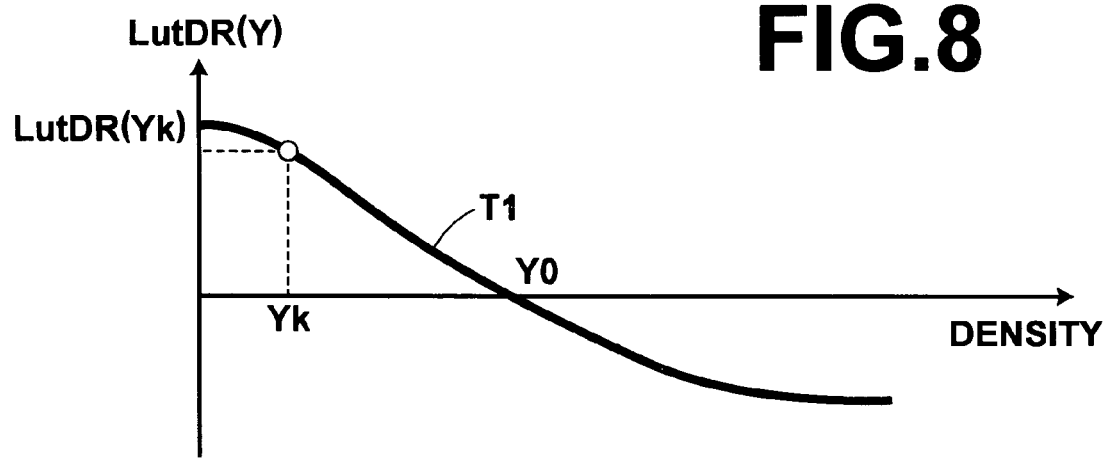
FIG. 8 shows an example of a compression table prepared in advance.
Figure 9:
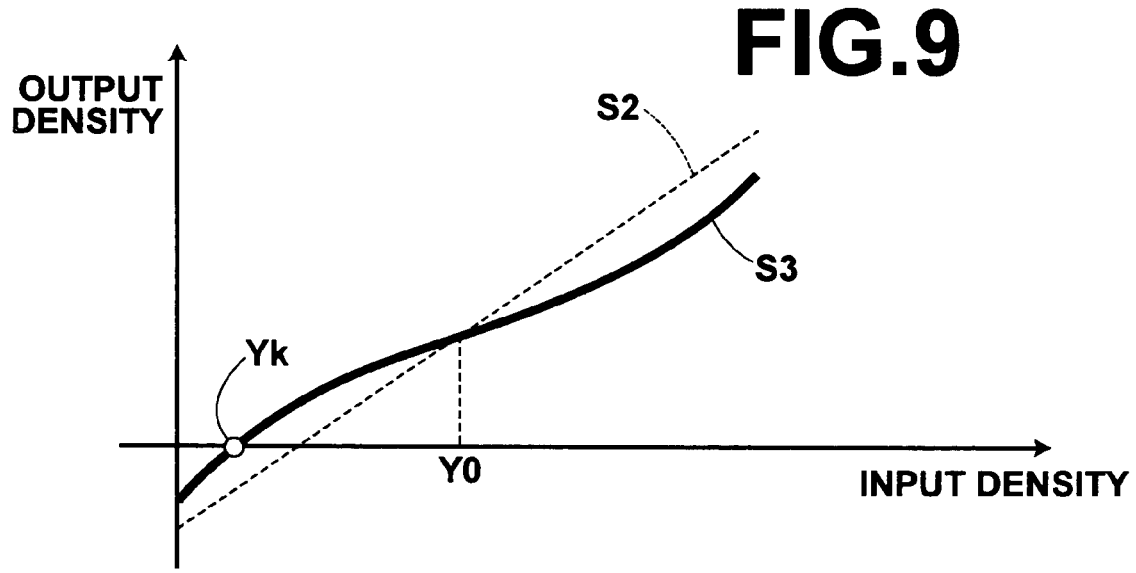
FIG. 9 shows a chart for explaining dynamic range compression processing by using the compression table illustrated in FIG. 8.

Further, in the first embodiment as described above, the image analysis unit 23 and the compression table creation unit 24 create the compression table T0. However, the correction amount C0 of the dynamic range may be calculated by using a compression table (called T1), which has been prepared in advance. FIG. 8 shows an example of the compression table T1 prepared in advance. When the dynamic range of the image S2 is compressed by using the compression table T1 as illustrated in FIG. 8, the density in the highlight side is increased and the density in the shadow side is reduced as illustrated in FIG. 9, and the processed image S3 may be obtained. However, a low density area in the highlight side, of which density is lower than the density Yk, may not be reproduced at the image output unit 3.

Therefore, if the compression table T1 prepared in advance is used, the minimum density Yk which can be reproduced at the image output unit 3 may be obtained and a correction amount LutDR(Yk) of the density Yk may be obtained by using the compression table T1. Then, the correction amount LutDR(Yk) may be used as the dynamic range compression rate and the judgment may be made as to whether the dynamic range compression rate is larger than a predetermined threshold value Th3. In this case, if the judgment is YES, loss of the fine texture in the image by the dynamic range compression processing is significant. Therefore, the correction amount C0 of the dynamic range is calculated from the unsharp density Y'. If the judgment is NO, the change amount of the image by image processing is small and loss of the fine texture in the image S2 is insignificant. Therefore, the correction amount C0 of the dynamic range should be calculated from the density Y.

Since the compression table T1 is non-linear, a differential value at the density Yk may be obtained and judgment may be made as to whether the differential value is larger than a predetermined threshold value Th4. Alternatively, judgment may be made as to whether a predetermined value (namely a value added to or subtracted from the image S1 to obtain the image S2 from the image S1), which is used at the AE processing unit 22, is larger than a predetermined threshold value Th5.

In these cases, if the judgment is YES, loss of the fine texture in the image by the dynamic range compression processing is significant. Therefore, the correction amount C0 of the dynamic range is calculated from the unsharp density Y'. If the judgment is NO, the change amount of the image by the image processing is small and loss of the fine texture in the image S2 is insignificant. Therefore, the correction amount C0 of the dynamic range should be calculated from the density Y.

Figure 10:
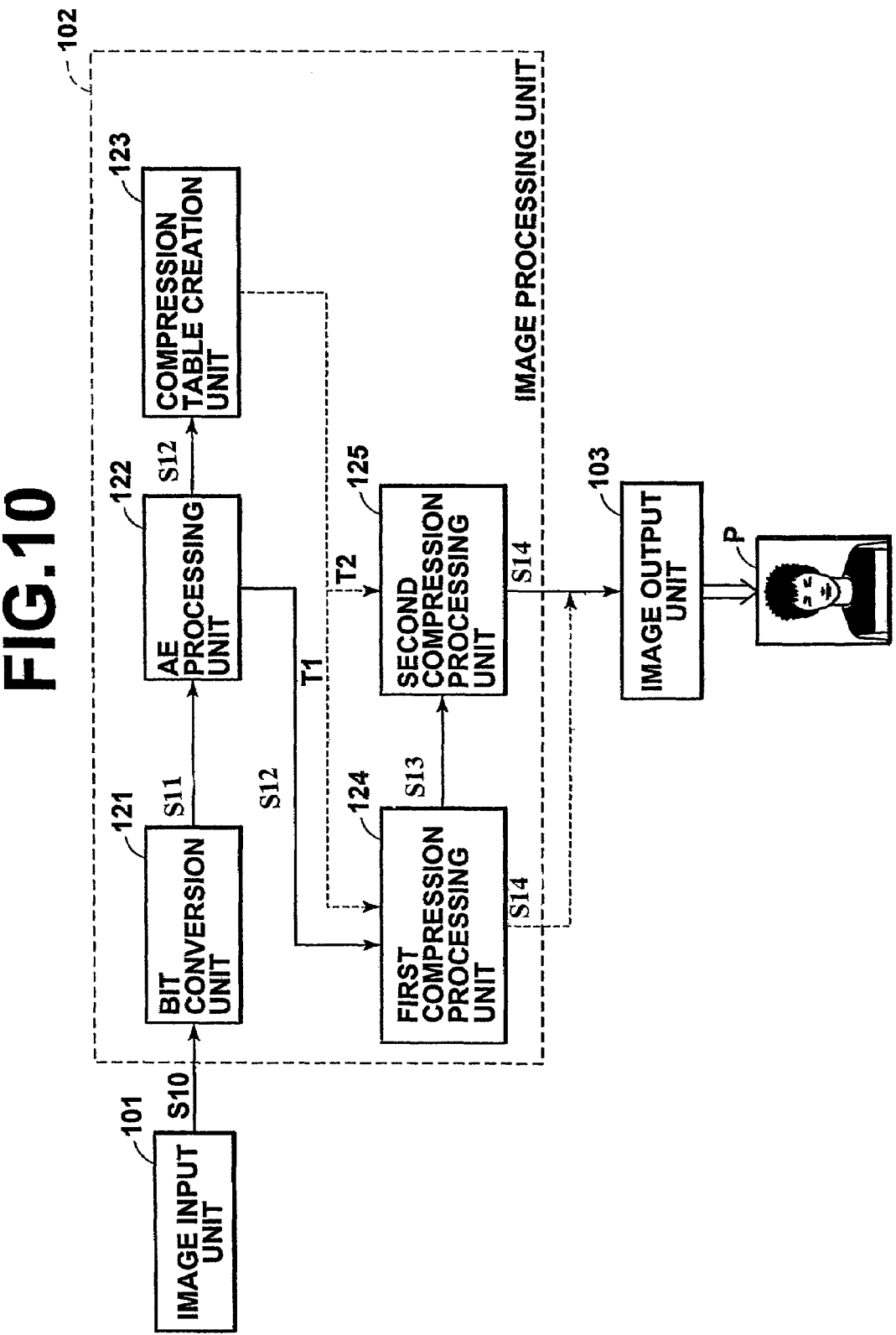
FIG. 10 shows a schematic block diagram illustrating the configuration of an image processing apparatus according to the second embodiment of the present invention.

Next, the second embodiment of the present invention will be described. FIG. 10 shows a schematic block diagram illustrating the configuration of the image processing apparatus according to the second embodiment of the present invention. As illustrated in FIG. 10, the image processing apparatus according to the second embodiment includes an image input unit 100 for receiving an input of an image data set S10 including each of the color components of RGB data, which represents a color image, an image processing unit 102 for obtaining a processed image data set S14 by performing image processing including dynamic range compression processing on the image data set S10 and an image output unit 103 such as a printer and a monitor, for reproducing the processed image data set S14. In the second embodiment, the image output unit 103 is a printer for obtaining a print P of the processed image data set S14. In the second embodiment, reference signs S10, S11, S12, S13 and S14 similar to the reference signs of the image data sets are also used to indicate the images represented by the image data sets S10, S11 and S12, the intermediate processed image data set S13 and the processed image data set S14, respectively.

The image input unit 100 has a function similar to that of the image input unit 1 in the aforementioned first embodiment.

The image processing unit 102 includes a bit conversion unit 121 for obtaining an image data set S11 on which bit conversion has been performed by converting the image data set S10 of 8 bits to the image data set S11 of 10 or 12 bits. The image processing unit 102 also includes an AE processing unit 122 for obtaining an image data set S12, on which AE processing has been performed, by performing the AE processing on the image data set S11. The image processing unit 102 also includes a compression table creation unit 123 for creating a first compression table T1 and a second compression table T2 for compressing the dynamic range of the image S12. The image processing unit 102 also includes a first compression processing unit 124 for obtaining the intermediate processed image data set S13 by compressing the dynamic range of the image S12 by using the first compression table T1. The image processing unit 102 also includes a second compression processing unit 125 for obtaining the processed image data set S14 by compressing the dynamic range of the intermediate processed image, which is represented by the intermediate processed image data set S13, by using the second compression table T2.

The bit conversion unit 121 has a function similar to that of the bit conversion unit 21 in the first embodiment as described above.

The AE processing unit 122 has a function similar to that of the AE processing unit 22 in the first embodiment as described above.

The compression table creation unit 123 creates the first compression table T1 and the second compression table T2 in the following manner. First, creation of the first compression table T1 will be described. The compression table creation unit 123 calculates density Y of each pixel in the image S12 by the above expression (1). R0, G0 and B0 in the expression (1) are RGB data R12, G12 and B12 of each pixel of the image S12.

Next, the compression table creation unit 123 obtains a histogram of the density Y as illustrated in FIG. 3. Further, the compression table creation unit 123 obtains a density where a cumulative relative frequency from the highlight side indicates 3% as a highlight density Yh of the image data set S12 and a density where a cumulative relative frequency from the shadow side indicates 3% as a shadow density Ys of the image data set S12, respectively.

Meanwhile, information about the minimum density Dmin and the maximum density Dmax which may be reproduced by the image output unit 103 has been input to the compression table creation unit 123. The compression table creation unit 123 compares the highlight density Yh and the minimum density Dmin. If the highlight density Yh is lower than the minimum density Dmin, the compression table creation unit 123 calculates a coefficient Ph to obtain a gradient of the first compression table T1 so that the highlight density Yh with respect to the standard density Y0, which has been set in advance, does not exceed the minimum density Dmin. Meanwhile, the compression table creation unit 123 compares the shadow density Ys and the maximum density Dmax. If the shadow density Ys is higher than the maximum density Dmax, the compression table creation unit 123 calculates a coefficient Ps to obtain a gradient of the first compression table T1 so that the shadow density Ys with respect to the standard density Y0, which has been set in advance, does not exceed the maximum density Dmax. Specifically, the coefficients Ph and Ps are calculated as shown in the above expressions (2) and (3).

Here, for example, if a subject included in the image S10 is a person as in the aforementioned first embodiment, a value of the standard density Y0 is set to a value between 0.50 and 0.70 (as a ratio to a range corresponding to a bit number), which is substantially the same as the density of flesh color. Preferably, the value should be set to 0.6.

If the highlight density Yh does not exceed the minimum density Dmin, the coefficient Ph is not calculated. If the shadow density Ys does not exceed the maximum density Dmax, the coefficient Ps is not calculated.

Figure 11:
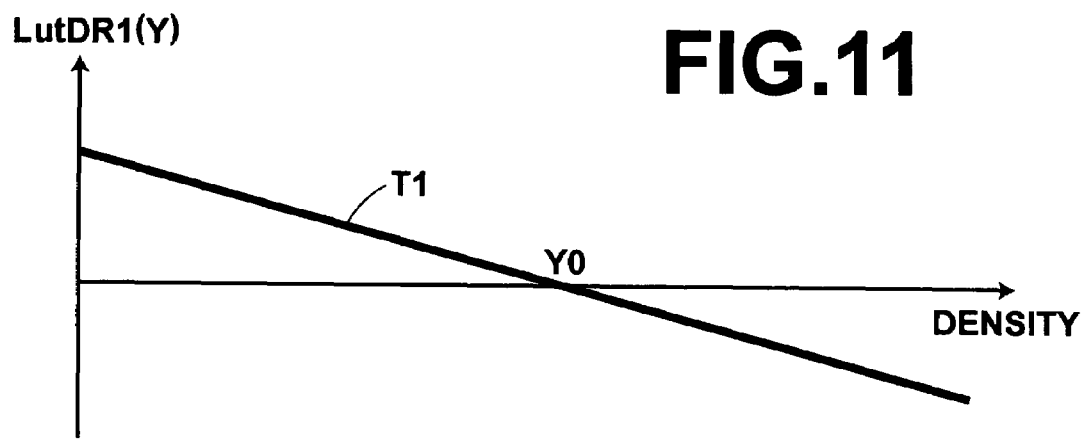
FIG. 11 shows an example of a first compression table for compressing a dynamic range in the shadow side and the highlight side.

The compression table creation unit 123 creates the first compression table T1 based on the coefficients Ph and Ps. FIG. 11 shows an example of the first compression table. As illustrated in FIG. 11, the aforementioned standard density Y0 is indicated in the first compression table T1. The gradient of the straight line is Ph−1 in the highlight side (namely the left side of the standard density Y0) and Ps−1 in the shadow side (namely the right side of the standard density Y0), respectively.

Figure 12:
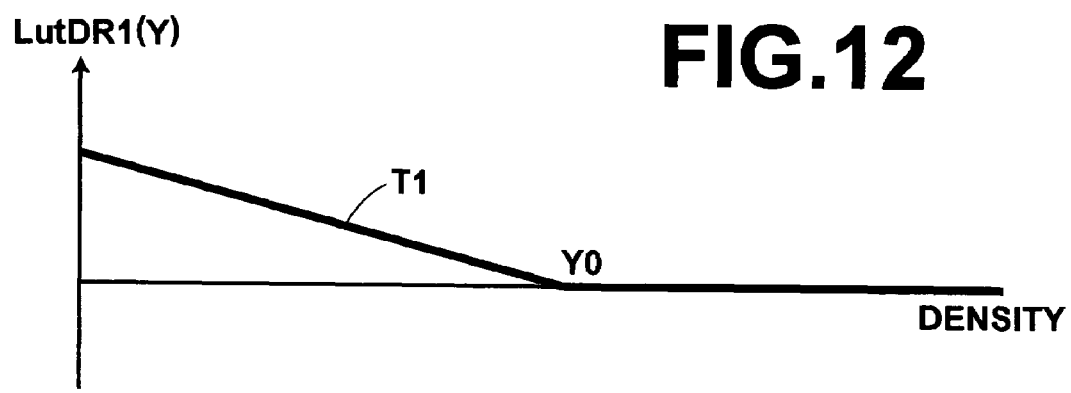
FIG. 12 shows an example of the first compression table for compressing the dynamic range in the highlight side.
Figure 13:
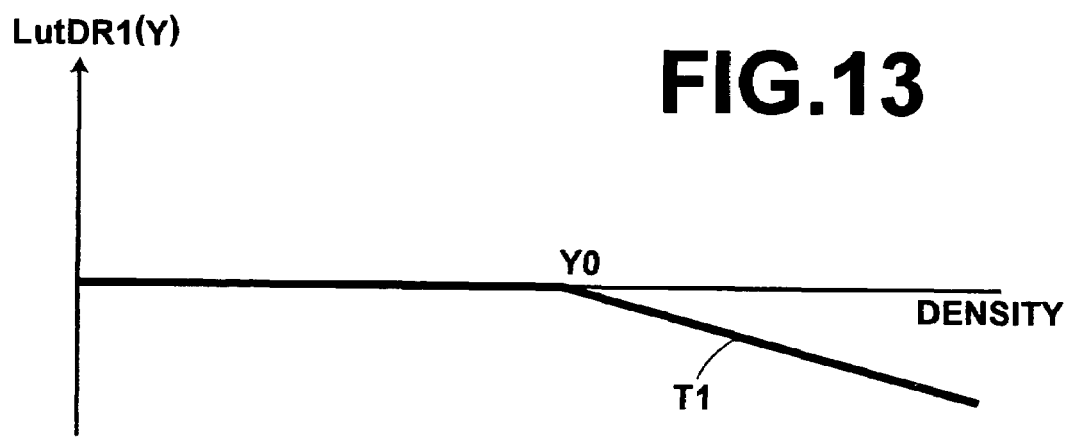
FIG. 13 shows an example of the first compression table for compressing the dynamic range in the shadow side.

If the compression table creation unit 123 has not calculated the coefficient Ps, the compression table creation unit 123 creates the first compression table T1 for compressing only the highlights, as illustrated in FIG. 12. Further, if the compression table creation unit 123 has not calculated the coefficient Ph, the compression table creation unit 123 creates the first compression table T1 for compressing only the shadows, as illustrated in FIG. 13. In the second embodiment, it is assumed that the compression table creation unit 123 has created the first compression table T1 for compressing both the shadows and the highlights.

Here, if the part where the gradient changes (, namely the point of the standard density Y0), is discontinuous, artifacts might be generated in the processed image. Therefore, generation of the artifacts may be prevented by setting a function so that the gradient becomes continuous.

Figure 14:
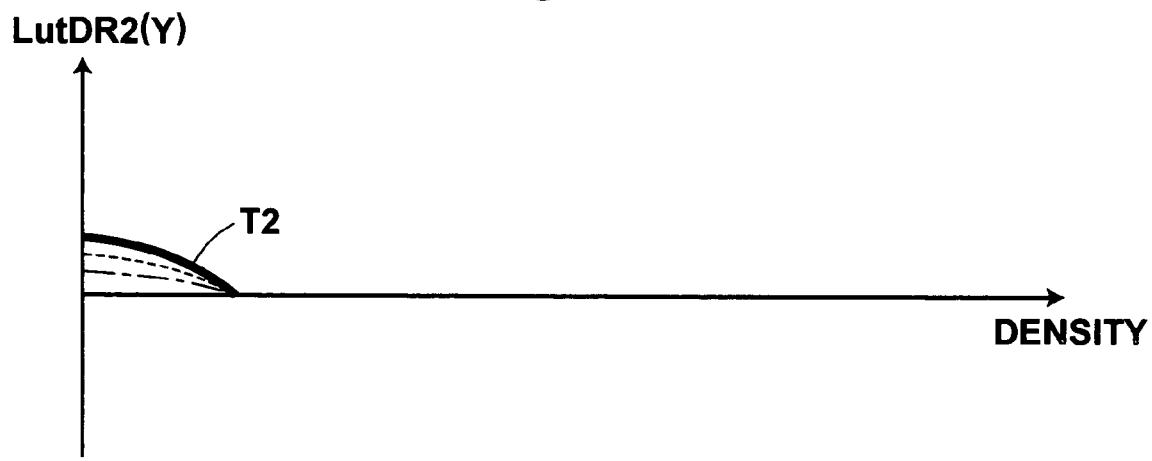
FIG. 14 shows an example of a second compression table for compressing the dynamic range in the highlight side.

Next, when the compression table creation unit 123 creates the second compression table T2, the compression table creation unit 123 judges whether a human face is included in the image S12. Specifically, the judgment is made as to whether the face is included in the image S12 by judging whether a flesh color region is included in the image S12. If it is judged that a face is included in the image, a ratio of the facial region to the entire area of the image S12 is calculated. If it is judged that a face is not included in the image S12, the second compression table T2, as illustrated in FIG. 14, is created to further compress the dynamic range in the highlight side to supplement the compression rate, which was insufficient during dynamic range compression by using the first compression table T1. If it is judged that a face is included in the image S12, judgment is further made as to whether a ratio of the facial region to the entire area of the image S12 exceeds a predetermined threshold value Th1. If this judgment is NO, the second compression table T2 is created so that when the ratio of the facial region to the entire area of the image S12 is larger, the dynamic range compression rate is reduced, that is the correction amount of the dynamic range is reduced, because the gradation in the highlight side becomes important. Specifically, the second compression table T2 is created as illustrated with a wavy line and a dot-dashed line in FIG. 14. The compression rate of the second compression table T2 illustrated with the dot-dashed line is less than the compression rate of the second compression table T2 illustrated with the dotted line.

Meanwhile, if it is judged that the ratio of the facial region to the entire area of the image S12 exceeds a predetermined threshold value Th1, the compression table creation unit 123 does not create the second compression table T2.

The first compression processing unit 124 compresses the dynamic range of the image data set S12 in the following manner. The first compression processing unit 124 calculates the density Y of each pixel of the image S12 by the aforementioned expression (1). Then, filtering processing is performed on the image S12 by using a low-pass filter in a predetermined size and an unsharp image S12' having the unsharp density Y' is obtained. Here, if the size of the low-pass filter is too small, the sharpness is unnaturally emphasized and the overshoot at the edges becomes significant. Meanwhile, if a size of a major subject such as a face is small, an effect of an unsharp mask is not sufficiently realized and a size of the apparatus becomes large because an amount of operations increases. Therefore, in the second embodiment, the size of the low-pass filter is set to prevent these problems.

Next, the first compression processing unit 124 performs dynamic range compression processing on the image data set S12 by using the first compression table T1 created by the compression table creation unit 123. Specifically, the first compression processing unit 124 calculates a value of LutDR1(Y') as the first correction amount. The value of LutDR1(Y') is a value obtained by processing the unsharp density Y' of each pixel by using the first compression table T1. The first compression processing unit 124 obtains each of the processed color components R13, G13 and B13 of RGB data by adding the first correction amount LutDR1(Y') to each of the color components R12, G12 and B12 of RGB data of each pixel in the image S12, as shown in the following expressions (7)-(9):

$$R13=R12+LutDR1(Y') \quad (7)$$

$$G13=G12+LutDR1(Y') \quad (8)$$

$$B13=B12+LutDR1(Y') \quad (9).$$

Then, the first compression processing unit 124 outputs the intermediate processed image data set S13, including each of the processed color components R13, G13 and B13 of RGB data, to the second compression processing unit 125.

Figure 15:
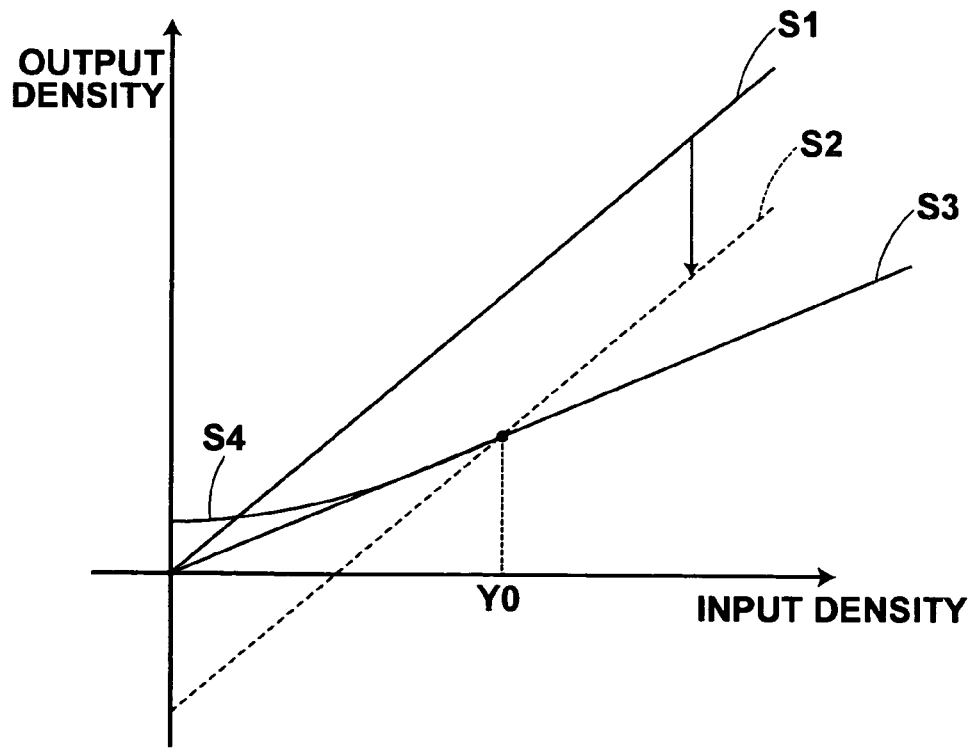
FIG. 15 shows a chart for explaining AE processing and dynamic range compression processing in the second embodiment.
Figure 16:
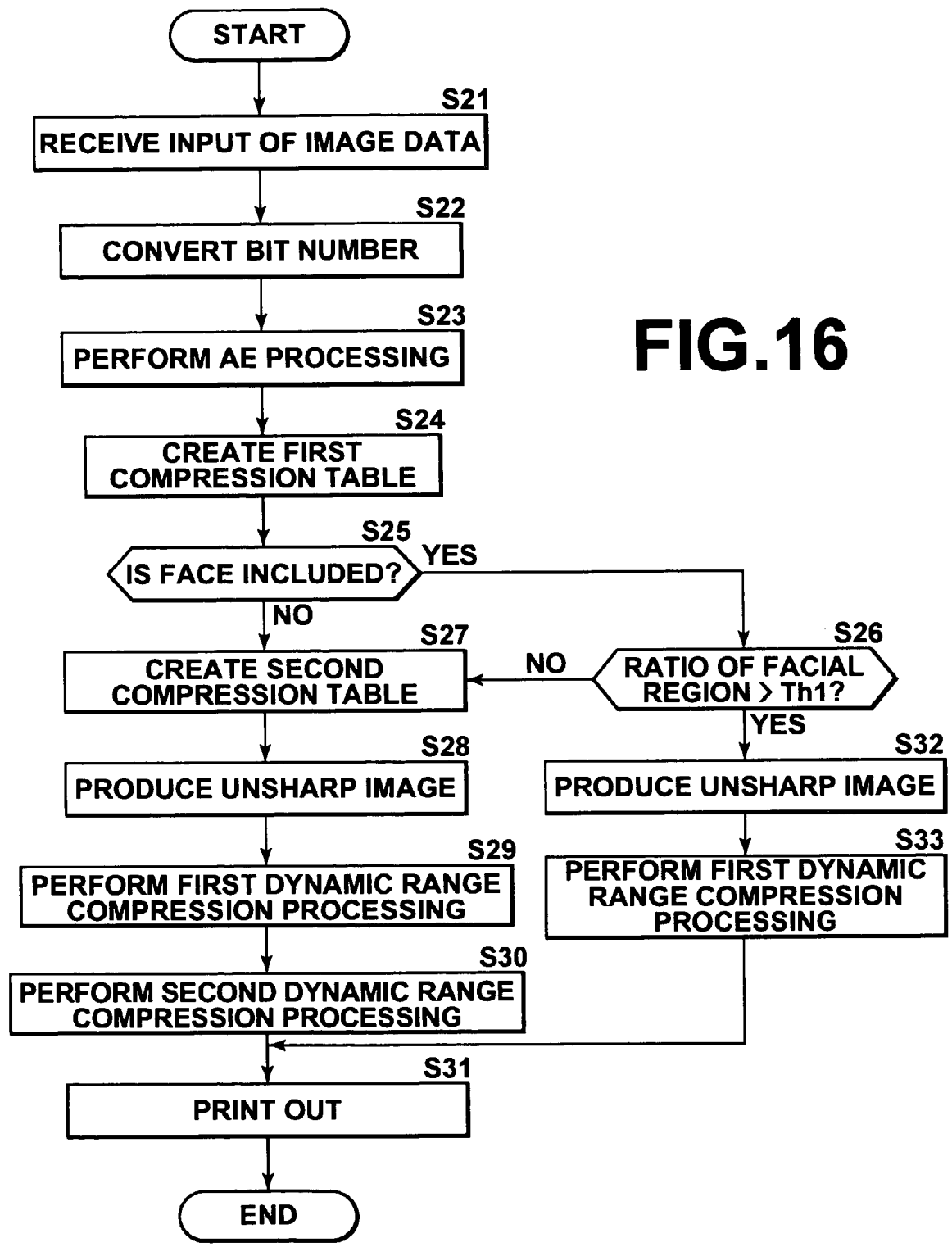
FIG. 16 shows a flow chart of processing performed in the second embodiment.

Accordingly, the density in the highlight side of the image S12 with respect to the standard density Y0 is increased and the density in the shadow side of the image S12 with respect to the standard density Y0 is reduced, as illustrated in FIG. 15. In this way, the dynamic range of the image S12 is compressed.

If the second compression table T2 has been created, the second compression processing unit 125 compresses the dynamic range of the intermediate processed image data set S13 in the following manner. The second compression processing unit 125 calculates the density Y of each pixel of the intermediate processed image S13 by the aforementioned expression (1). Then, the second compression processing unit 125 performs dynamic range compression processing on the intermediate processed image S13 by using the second compression table T2 created by the compression table creation unit 123. Specifically, the second compression processing unit 125 calculates a value of LutDR2(Y) as the second correction amount. The second compression processing unit 125 processes the density Y of each pixel of the intermediate processed image S13 by using the second compression table T2 to obtain the value of LutDR2(Y). The second correction amount LutDR2(Y) is added to each of the color components R13, G13 and B13 of RGB data of each pixel in the intermediate processed image S13 and each of the processed color components R14, G14 and B14 of RGB data is obtained, as shown in the following expressions (10)-(12):

$$R14=R13+LutDR2(Y) \quad (10)$$

$$G14=G13+LutDR2(Y) \quad (11)$$

$$B14=B13+LutDR2(Y) \quad (12).$$

Then, the second compression processing unit 125 outputs the processed image data set S14 including each of the color components R14, G14 and B14 of RGB data to the image output unit 103.

Accordingly, the density in the highlight side of the intermediate processed image S13 is increased as illustrated in FIG. 15 and the dynamic range of the intermediate processed image S13 is compressed.

The image output unit 103 has a function similar to that of the image output unit 3 in the first embodiment as described above.

Next, an operation in the second embodiment will be described. FIG. 8 shows a flow chart illustrating processing performed in the present embodiment. First, the image input unit 100 receives an input of the image data set S10 (step S21). Next, the bit conversion unit 121 performs bit conversion on the image data set S10 and obtains an image data set S11 (step S22). The AE processing unit 122 performs AE processing on the image data set S11 and obtains an image data set S12 (step S23). Then, the compression table creation unit 123 creates the first compression table T1 (step S24).

Then, the compression table creation unit 123 judges whether the image S12 includes a face (step S25). If step S25 is YES, the compression table creation unit 123 further judges whether a ratio of the facial region to the image S12 exceeds a threshold value Th1 (step S26). If step S25 and step S26 are NO, the compression table creation unit 123 creates the second compression table T2 (step S27).

Next, the first compression processing unit 124 produces the unsharp image S12' having the unsharp density Y' obtained from the density Y of the image S12 (step S28). The first compression processing unit 124 refers to the first compression table T1 and calculates a correction amount (first correction amount) of the dynamic range from the unsharp density Y'. The first compression processing unit 124 compresses the dynamic range of the image S12 by the first correction amount and obtains the intermediate processed image data set S13 (first dynamic range compression processing, step S29).

Then, the second compression processing unit 125 refers to the second compression table T2 and calculates a correction amount (second correction amount) of the dynamic range. The second compression processing unit 125 compresses the dynamic range of the intermediate processed image S13 by the second correction amount and obtains the processed image data set S14 (second dynamic range compression processing, step S30). Then, the image output unit 103 prints out the processed image data set S14 (step S31) and processing ends.

Meanwhile, if step S26 is YES, the compression table creation unit 123 does not create the second compression table T2. Therefore, the first compression processing unit 124 produces the unsharp image S12' having the unsharp density Y' obtained from the density Y of the image S12 (step S32). The first compression processing unit 124 refers to the first compression table T1 and calculates the correction amount of the dynamic range from the unsharp density Y'. The first compression processing unit 124 compresses the dynamic range of the image S12 by the correction amount and obtains the intermediate processed image data set S13 (first dynamic range compression processing, step S33). Then, the first compression processing unit 124 outputs the intermediate processed image data set S13 to the image output unit 103 as the processed image data set S14. The image output unit 103 prints out the processed image data set S14 (step S31) and processing ends.

As described above, in the second embodiment, the first compression table T1 and the second compression table T2 for supplementing the compression rate which was insufficient during the dynamic range compression by using the first compression table T1 are created. First, the unsharp image S12' of the image S12 is produced and the dynamic range of the image S12 is compressed by using the unsharp image S12' and the first compression table T1 to obtain the intermediate processed image S13. Here, in the first dynamic range compression processing, the first correction amount of the dynamic range is calculated from the unsharp image S12'. However, the correction amount of the dynamic range is smaller than the correction amount corrected during the dynamic range compression by using a combined compression table of the first compression table T1 and the second compression table T2. Therefore, loss of fine texture in the image S12 is prevented and generation of the artifacts in the vicinity of the edges may be prevented. However, since the correction amount of the dynamic range is small, a processed image, of which the dynamic range is compressed in a desired manner, may not be obtained.

Therefore, in the second embodiment, the second correction amount for compressing the dynamic range is calculated by using the intermediate processed image S13 and the second compression table T2, and the processed image S14 is obtained. Accordingly, loss of fine texture in the image S12 is prevented and generation of the artifacts in the vicinity of the edges may be prevented. Further, a high quality processed image S14, of which the dynamic range has been compressed in a desired manner, may be obtained by a relatively small amount of operations.

Further, if a ratio of a facial region to an entire of the image S10 is large as in a portrait, an image of which the dynamic range has been compressed in a desired manner may be obtained without performing the second dynamic range compression processing. Therefore, judgment is made as to whether the second compression table T2 should be created. Only if the judgment is YES, the second compression table T2 is created. If the second compression table T2 is not created, the intermediate processed image S13 obtained in the first dynamic range compression processing is output as the processed image S14. Accordingly, the amount of operations may be further reduced.

Further, in the second embodiment as described above, the judgment is made as to whether the ratio of the facial region to the image S12 exceeds the threshold value Th1. If the judgment is YES, the second compression table T2 is not created and only the first dynamic range compression processing by using the first compression table T1 is performed. However, the second compression table T2 may always be created without making the judgment and both of the first dynamic range compression processing and the second dynamic range compression processing may always be performed.

Figure 17A:
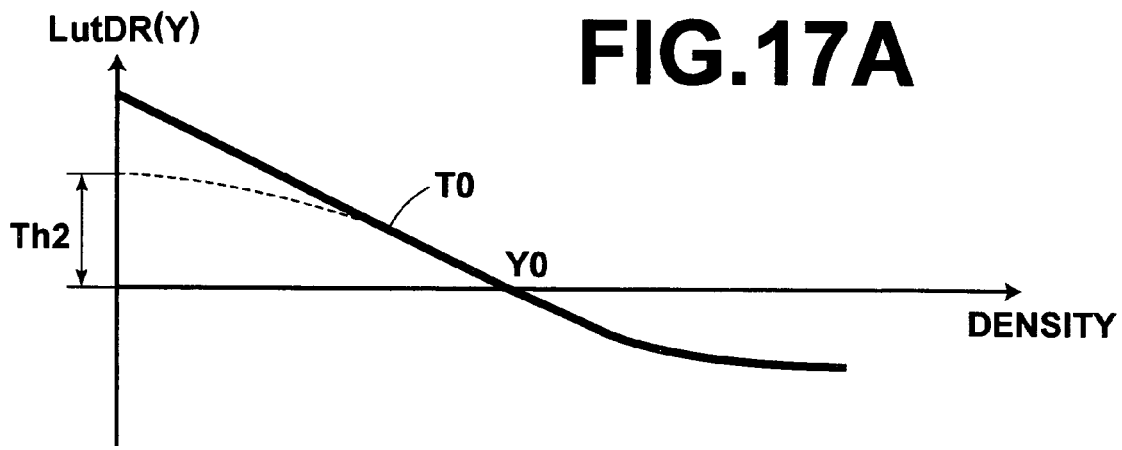
FIG. 17A shows a chart for explaining creation of the first compression table and the second compression table by dividing a single compression table.
Figure 17B:
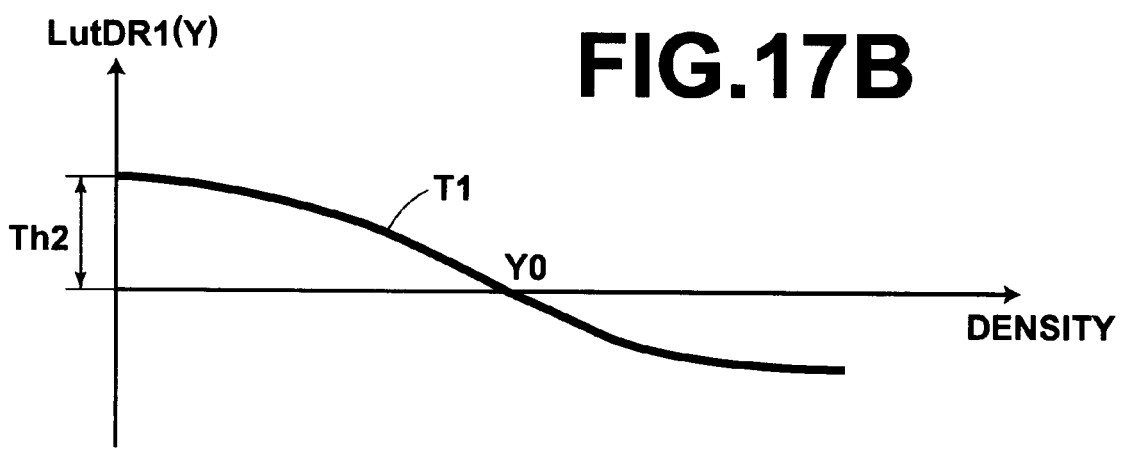
FIG. 17B shows a chart for explaining creation of the first compression table and the second compression table by dividing the single compression table.
Figure 17C:
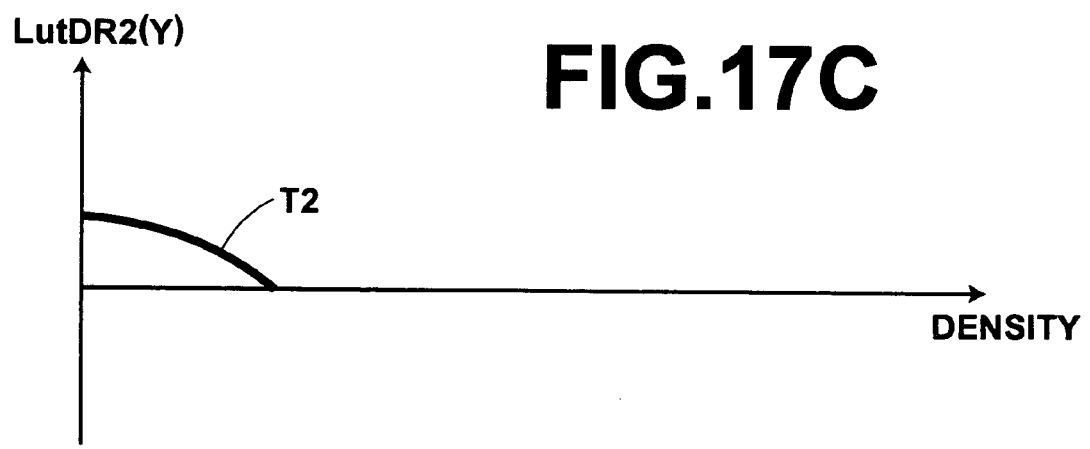
FIG. 17C shows a chart for explaining creation of the first compression table and the second compression table by dividing a single compression table.

Further, in the second embodiment as described above, the compression table creation unit 123 creates the first compression table T1 and the second compression table T2 separately. However, a single compression table T0 may be created once in a manner similar to creation of the aforementioned first compression table T1, as illustrated in FIG. 17A. If the dynamic range compression rate by using the compression table T0 exceeds a predetermined threshold value, the compression table T0 may be divided into the first compression table T1 and the second compression table T2. For example, if the correction amount at the minimum density exceeds the threshold value Th2, as illustrated in FIG. 17A, the compression table T0 should be divided into the first compression table T1 and the second compression table T2 as illustrated in FIGS. 17B and 17C.

Accordingly, generation of artifacts in the vicinity of the edges may be prevented when compared with a case of compressing the dynamic range by using only the compression table T0.

Further, a value of a gradient of the compression table T0, a differential value of the compression table T0 or the like may be used to judge whether the dynamic range compression rate exceeds a predetermined threshold value.

Figure 18:
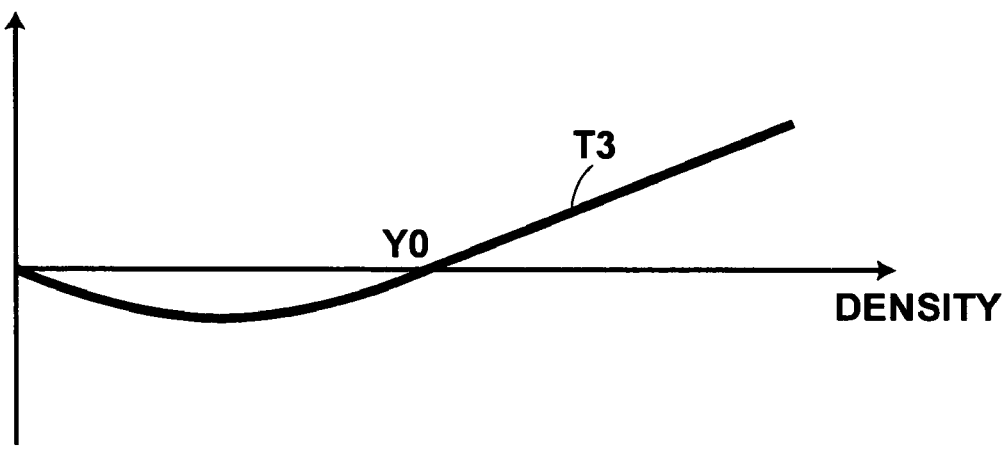
FIG. 18 shows an example of a fixed compression table for compressing the highlight side and preserving the gradation in the medium density area at the same time.

Further, in the second embodiment as described above, there are cases where the dynamic range of the processed image data set S14 is further compressed by using a fixed compression table T3, as illustrated in FIG. 18. In the fixed compression table T3, the highlight side is compressed and the gradation in the medium density area is preserved at the same time. When the dynamic range of the processed image data set S14 is further compressed, it is preferable to create a second compression table T2 including a maximum correction amount by which the correction amount in the highlight side corrected by using the compression table T3 can be cancelled.

Figure 19:
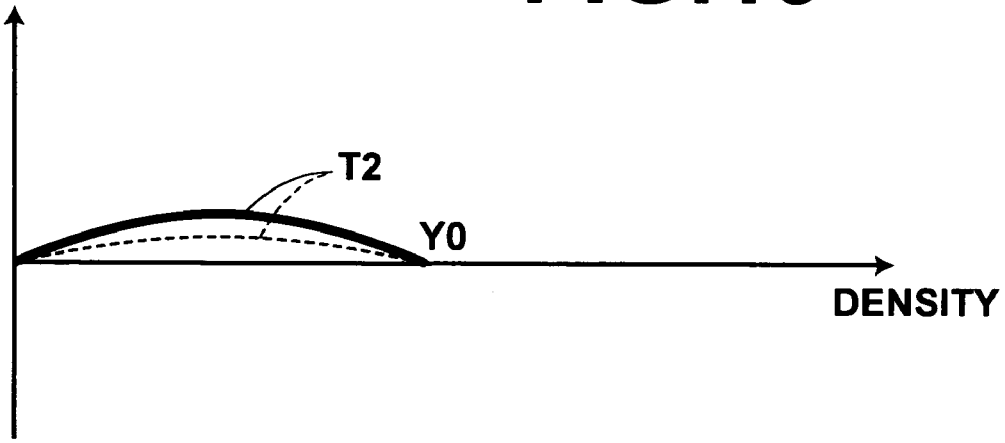
FIG. 19 shows another example of the second compression table for compressing the dynamic range in the highlight side.

When the dynamic range of the processed image data set S14 is further compressed by using the fixed compression table T3 as described above, if it is judged that the ratio of the facial region to the entire area of the image S12 exceeds the predetermined threshold value Th1, a second compression table T2 as indicated with a solid line in FIG. 19 should be created. The second compression table T2 includes the correction amount by which all of the correction amount in the highlight side corrected by using the compression table T3 can be cancelled. The dynamic range of the intermediate processed image data set S13 should be compressed by using the created second compression table T2.

Further, if contrast in the highlight side of the image S12 is low, a second compression table T2 as indicated with a broken line in FIG. 19 should be created. The second compression table T2 includes a correction amount, which is lower than the maximum correction amount by which the correction amount in the highlight side corrected by using the compression table T3 can be cancelled. The dynamic range of the intermediate processed image data set S13 should be compressed by using the created second compression table T2.

Further, in the second embodiment as described above, the second compression table T2 for compressing the dynamic range in the highlight side is used. However, the second compression table T2 for compressing the dynamic range in both the highlight side and the shadow side or the second compression table T2 for compressing the dynamic range only in the shadow side may also be used.

What is claimed is:

1. An image processing apparatus comprising:
    a correction amount calculation means for calculating a correction amount to be added to each pixel of an image to compress a dynamic range of the image by referring to a compression table that defines a relationship between the density of each pixel of the image and the compression amount for compressing the dynamic range of the image;
    a processing means for obtaining a processed image of which the dynamic range has been compressed by performing processing for compressing the dynamic range of the image by adding the correction amount to each pixel of the image; and
    a judgment means for judging whether an estimated change amount of the image by the processing for compressing the dynamic range, the estimated change amount being obtained from the compression table, is larger than a predetermined threshold value, wherein if the judgment is YES, the correction amount calculation means produces an unsharp image of the image and calculates the correction amount by using the unsharp image and by referring to the compression table, or if the judgment is NO, the correction amount calculation means calculates the correction amount by using the image instead of the unsharp image and by referring to the compression table.

2. An image processing method to be implement on an image processing apparatus, the method comprising the steps of:
    calculating a correction amount to be added to each pixel of an image to compress a dynamic range of the image by referring to a compression table that defines a relationship between the density of each pixel of the image and the compression amount for compressing the dynamic range of based the image;
    obtaining a processed image of which the dynamic range has been compressed by performing processing for compressing the dynamic range of the image by adding the correction amount to each pixel of the image;
    judging whether an estimated change amount of the image by the processing for compressing the dynamic range, the estimated change amount being obtained from the compression table, is larger than a predetermined threshold value; and
    if the judgment is YES, producing an unsharp image of the image and calculating the correction amount by using the unsharp image and by referring to the compression table, or if the judgment is NO, calculating the correction amount by using the image instead of the unsharp image and by referring to the compression table.

3. A computer readable medium encoded with a program for causing a computer to execute an image processing method, the program comprising the procedures for:
    calculating a correction amount to be added to each pixel of an image to compress a dynamic range of an image based on the image by referring to a compression table that defines a relationship between the density of each pixel of the image and the compression amount for compressing the dynamic range of the image;
    obtaining a processed image of which the dynamic range has been compressed by performing processing for compressing the dynamic range of the image by adding the correction amount to each pixel of the image;
    judging whether an estimated change amount of the image by the processing for compressing the dynamic range, the estimated change amount being obtained from the compression table, is larger than a predetermined threshold value; and
    if the judgment is YES, producing an unsharp image of the image and calculating the correction amount by using the unsharp image and by referring to the compression table, or if the judgment is NO, calculating the correction amount by using the image instead of the unsharp image and by referring to the compression table.

4. An image processing apparatus as defined in claim 1, wherein the correction amount calculations means calculates the correction amount by comparing a highlight density to the minimum density of an image output unit and comparing a shadow density to a maximum density of an image output unit; and
    wherein the highlight density and shadow density are each found at predetermined relative locations on a histogram of densities for the pixels of the image.

5. An image processing method as defined in claim 2, wherein calculating a correction amount comprises comparing a highlight density to the minimum density of an image output unit and comparing a shadow density to a maximum density of an image output unit; and
    wherein the highlight density and shadow density are each found at predetermined locations on a histogram of densities for the pixels of the image.

6. An computer readable medium encoding a program as defined in claim 3, wherein calculating a correction amount comprises comparing a highlight density to the minimum density of an image output unit and comparing a shadow density to a maximum density of an image output unit; and
    wherein the highlight density and shadow density are each found at predetermined locations on a histogram of densities for the pixels of the image.

7. An image processing apparatus as defined in claim 4, wherein the correction amount calculations means further calculates the correction amount by calculating coefficients Ph and Ps;
    wherein in Ph=(Dmin-YO)/(Yh-YO);
    wherein in Ps=(Dmax-YO)/(Ys-YO);
    where Yh is the highlight density, Ys is the shadow density, Dmax is the maximum density of an image output unit, Dmin is the minimum density of an image output unit, and YO is a predetermined standard density.

8. An image processing apparatus as defined in claim 7, wherein the correction amount calculations means only calculates Ph if Dmin<Yh, and only calculates Ps if Dmax>Ys.

9. An image processing apparatus as defined in claim 8, wherein the correction amount calculations means further calculates the correction amount by creating a compression table with a gradient Ph-1 for densities less than YO, and Ps-1 for densities greater than YO.

10. An image processing apparatus as defined in claim 8, wherein the compression table has no gradient for densities less than YO if Ph is not calculated, and wherein the compression table has no gradient for densities greater than YO if Ps is not calculated.

11. An image processing apparatus as defined in claim 1, the apparatus further comprising:

a table generation means for generating the compression table based on a comparison result obtained by calculating a density histogram of the image and by comparing a highlight density of the density histogram and a shadow density of the density histogram with a lowest density and a highest density that can be regenerated by an image output apparatus that outputs the processed image, respectively, wherein the correction amount calculation means calculates the correction amount by referring to the compression table generated by the table generation means, and wherein the judgment means uses, as the estimated change amount, the gradient of the compression table generated by the table generation means.

12. An image processing apparatus as defined in claim 1, wherein the judgment means uses, as the estimated change amount, a correction amount based on the compression table, the correction amount corresponding to a lowest density that can be regenerated by an image output apparatus that outputs the processed image.

* * * * *